(12) United States Patent
Disson et al.

(10) Patent No.: US 9,592,465 B2
(45) Date of Patent: Mar. 14, 2017

(54) FILTER MATERIAL

(71) Applicant: Mahle International GmbH, Stuttgart (DE)

(72) Inventors: Ralf Disson, Leutenbach (DE); Bernd Neubauer, Rudersberg (DE); Birgit Renz, Marbach (DE); Markus Steppe, Malmsheim (DE)

(73) Assignee: Mahle International GmbH (DE)

( * ) Notice: Subject to any disclaimer, the term of this patent is extended or adjusted under 35 U.S.C. 154(b) by 193 days.

(21) Appl. No.: 14/357,563

(22) PCT Filed: Nov. 8, 2012

(86) PCT No.: PCT/EP2012/072081
§ 371 (c)(1),
(2) Date: May 9, 2014

(87) PCT Pub. No.: WO2013/068436
PCT Pub. Date: May 16, 2013

(65) Prior Publication Data
US 2015/0013285 A1 Jan. 15, 2015

(30) Foreign Application Priority Data
Nov. 10, 2011 (DE) .......... 10 2011 086 104

(51) Int. Cl.
*B01D 46/00* (2006.01)
*F02M 35/08* (2006.01)
(Continued)

(52) U.S. Cl.
CPC ....... *B01D 46/0023* (2013.01); *B01D 39/163* (2013.01); *B01D 39/18* (2013.01);
(Continued)

(58) Field of Classification Search
CPC .. B01D 39/163; B01D 39/18; B01D 46/0023; B01D 46/521; B01D 46/528;
(Continued)

(56) References Cited

U.S. PATENT DOCUMENTS 3,096,230 A * 7/1963 Briggs .................. B01D 39/18
162/137
3,116,245 A * 12/1963 McNabb ............... B01D 29/111
162/135
(Continued)

FOREIGN PATENT DOCUMENTS

DE  3812849 A1  10/1989
DE  19731860 C1  1/1999
(Continued)

OTHER PUBLICATIONS

English abstract for DE-10144867.
English abstract for DE-69910660.
English abstract for DE-102007027268.

*Primary Examiner* — Amber R Orlando
*Assistant Examiner* — Britanny Precht
(74) *Attorney, Agent, or Firm* — Fishman Stewart PLLC

(57) ABSTRACT

A filter material for an air filter may include a substrate layer on an inflow side and a fine-fiber layer on an outflow side relative to a flow direction. The filter material may include a connection region arranged between the substrate layer and the fine-fiber layer. The substrate layer, connection region and fine-fiber layer may include pores having an aggregate degressive pore size with respect to the flow direction. A combined thickness of the substrate layer, connection region and fine-fiber layer may be at least 0.35 mm. The substrate layer may include a cellulose material and have an impregnation of resin disposed along the inflow side. The resin may amount to approximately 22% by mass of the substrate layer.

19 Claims, 1 Drawing Sheet

(51) Int. Cl.
*B01D 46/52* (2006.01)
*B01D 39/18* (2006.01)
*B01D 39/16* (2006.01)

(52) U.S. Cl.
CPC ......... *B01D 46/521* (2013.01); *B01D 46/528* (2013.01); *F02M 35/08* (2013.01); *B01D 2239/0464* (2013.01); *B01D 2239/065* (2013.01); *B01D 2239/0622* (2013.01); *B01D 2239/0636* (2013.01); *B01D 2239/0654* (2013.01); *B01D 2239/0681* (2013.01); *B01D 2239/0695* (2013.01); *B01D 2239/1208* (2013.01); *B01D 2239/1216* (2013.01); *B01D 2275/10* (2013.01); *B01D 2275/105* (2013.01); *B01D 2275/305* (2013.01)

(58) Field of Classification Search
CPC .... B01D 2239/0464; B01D 2239/0622; B01D 2239/0636; B01D 2239/065; B01D 2239/0654; B01D 2239/0681; B01D 2239/0695; B01D 2239/1208; B01D 2239/1216; F02M 35/08
See application file for complete search history.

(56) References Cited

U.S. PATENT DOCUMENTS

| | | | | |
|---|---|---|---|---|
| 3,158,532 | A | * | 11/1964 | Pall .................. B01D 39/2013 162/102 |
| 4,119,543 | A | * | 10/1978 | Lawson ................. B01D 39/14 210/496 |
| 4,395,291 | A | * | 7/1983 | Limare .................. C03C 1/028 106/435 |
| 4,470,859 | A | * | 9/1984 | Benezra .................... C25B 9/10 156/155 |
| 4,581,050 | A | * | 4/1986 | Krantz ................... A47L 9/102 55/315.2 |
| 4,702,940 | A | | 10/1987 | Nakayama et al. |
| 4,723,967 | A | * | 2/1988 | Tom .................. B01D 53/0407 137/205.5 |
| 4,867,662 | A | * | 9/1989 | Shimahara ............. B28B 1/263 249/109 |
| 5,084,178 | A | * | 1/1992 | Miller .................. B01D 29/012 156/474 |
| 5,472,600 | A | | 12/1995 | Ellefson et al. |
| 5,549,832 | A | * | 8/1996 | Ische ........................ C09K 5/20 210/694 |
| 6,045,595 | A | | 4/2000 | Freudenberg |
| 6,074,972 | A | * | 6/2000 | Bratton .................. B01J 20/183 165/104.15 |
| 6,103,645 | A | * | 8/2000 | Chang .................. B01D 39/083 428/304.4 |
| 6,139,595 | A | * | 10/2000 | Herman .................. B01D 45/14 55/312 |
| 6,139,942 | A | * | 10/2000 | Hartness ............... B29B 15/105 428/297.4 |
| 6,746,517 | B2 | | 6/2004 | Benson et al. |
| 6,966,939 | B2 | | 11/2005 | Rammig et al. |
| 8,584,868 | B2 | | 11/2013 | Wyhler et al. |
| 2003/0010710 | A1 | * | 1/2003 | Homonoff ............ B01D 39/163 210/496 |
| 2003/0150199 | A1 | | 8/2003 | Tanaka et al. |
| 2004/0255783 | A1 | * | 12/2004 | Graham .................. A47L 9/122 96/69 |
| 2005/0235619 | A1 | | 10/2005 | Heinz et al. |
| 2009/0071113 | A1 | | 3/2009 | Oba et al. |
| 2011/0079553 | A1 | * | 4/2011 | Thomson ........... B01D 39/1623 210/489 |
| 2011/0195002 | A1 | * | 8/2011 | Miller .................... B01D 53/22 423/210 |
| 2012/0183799 | A1 | * | 7/2012 | Steele ................ B01D 39/2027 428/550 |

FOREIGN PATENT DOCUMENTS

| | | |
|---|---|---|
| DE | 29907699 U1 | 8/1999 |
| DE | 69512088 T2 | 5/2000 |
| DE | 10144867 A1 | 3/2003 |
| DE | 10221694 A1 | 12/2003 |
| DE | 69910660 T2 | 6/2004 |
| DE | 60111554 T2 | 5/2006 |
| DE | 102007027268 A1 | 12/2008 |
| DE | 102008035934 A1 | 2/2009 |
| DE | 202009003669 U1 | 8/2010 |
| DE | 102009050447 A1 | 4/2011 |
| DE | 102010014060 A1 | 10/2011 |
| EP | 1366791 A1 | 12/2003 |

\* cited by examiner

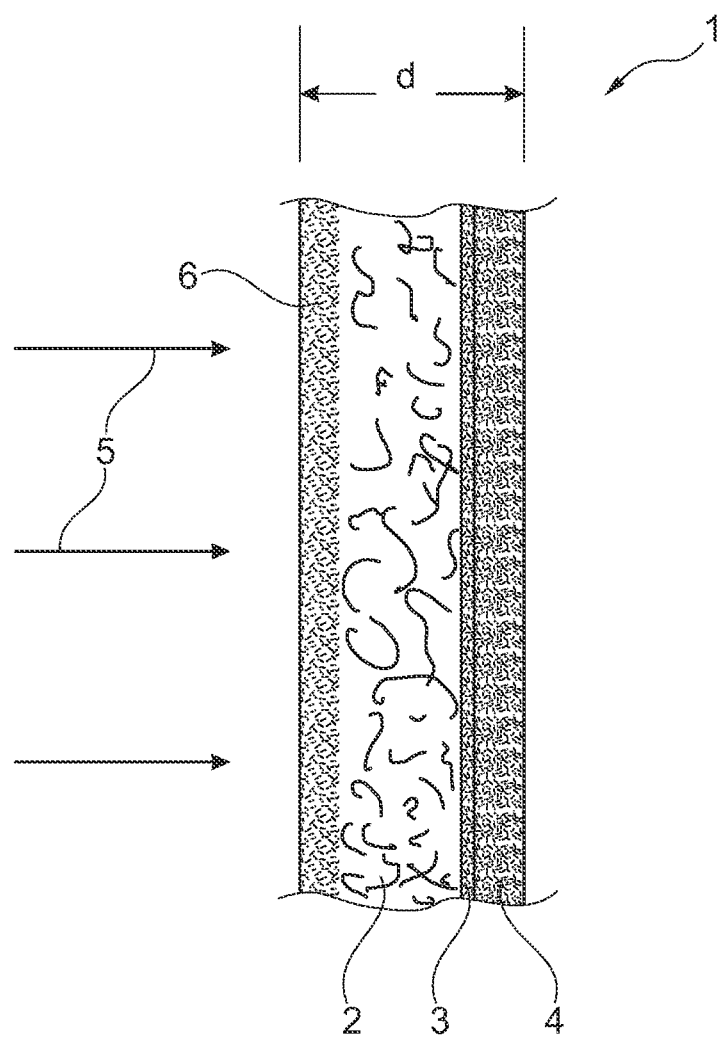

FILTER MATERIAL

CROSS-REFERENCE TO RELATED APPLICATIONS

This application claims priority to German Patent Application DE 10 2011 086 104.1 filed Nov. 10, 2011 and International Patent Application PCT/EP2012/072081 filed Nov. 8, 2012, both of which are hereby incorporated by reference in their entirety.

TECHNICAL FIELD

The present invention relates to a filter material, in particular for an air filter, according to the preamble of Claim 1.

BACKGROUND

From WO 2011/110637 A2 a generic filter medium of a filter element for the filtration of a fluid, in particular of a liquid fuel, water, engine oil or air is known, which comprises at least one non-woven filter layer of synthetic individual fibres. The filter medium has a degree of separation which increases in the flow direction for the particles to be filtered out. The filter layer additionally has a compressed character which increases in flow direction.

From DE 299 07 699 U1 a filter material, comprising at least one substrate material layer and at least one fibre fleece layer is known. The at least one fibre fleece layer comprises a nanofibre fleece layer with an average diameter from 10 to 1,000 nanometres and further nanofibre specific parameters. The substrate material layer in this case is constructed of a filter paper.

From DE 197 31 860 C1 in turn a filter material which is constructed of multiple layers is known, with a fibre layer which is laminated together with a paper substrate layer.

SUMMARY

The present invention deals with the problem of stating an improved or at least an alternative embodiment for a filter material of the generic type, which is characterized in particular by a high soot absorption capacity and a high degree of separation.

According to the invention, this problem is solved through the subjects of the independent claims. Advantageous embodiments are subject of the dependent claims. The present invention is based on the general idea of providing a degressive pore size in flow direction in a filter material, which is realized in that a substrate layer of the filter material on the inflow side and a fine-fibre layer on the outflow side are connected to one another via a connection region located in between. Additionally, an impregnation is applied at least to the inflow side of the substrate layer. The substrate layer arranged on the inflow side can for example be formed as an open cellulose layer. Here, the substrate layer is embodied thick relative to the total filter material. The percentage thickness of the substrate layer is greater than 75%, preferentially greater than 80% of the thickness of the total composite. The thickness of the substrate layer is approximately 0.3 mm to 1.0 mm, preferentially approximately 0.60 mm to 0.65 mm. The thickness of the substrate layer is determined at a 0.5 kPa measurement pressure. A substrate layer which has not been processed further is being considered here. The thickness of the substrate layer can diminish with various processing steps, e.g. through wrapping, folding or calibrating. Furthermore, the substrate layer comprises many open pores. Thus, the substrate layer through the open pores and the great substrate layer thickness has a high soot absorption capacity. On the outflow side of the substrate layer, a fine-fibre layer is applied. For the fine-fibre layer, which can be formed for example as a so-called melt-blown layer, comprises a high degree of separation with however merely a low soot absorption capacity. Here, the fine-fibre layer has a smaller maximum percentage thickness of 25%, in particular 20% of the thickness of the total composite. With advantageous configurations, the thickness of the fine-fibre layer can be approximately 0.15 mm to 0.23 mm, preferentially approximately 0.19 mm. The thickness of the fine-fibre layer is likewise determined at 0.5 kPa measurement pressure. A fine-fibre layer which has not been further processed is being considered here. The thickness of the fine-fibre layer can diminish during various processing steps, e.g. through wrapping, folding or calibrating. It is possible, in particular, that the fine-fibre layer is compressed by a substantial percentage of more than 50% under certain conditions during the following processing steps or sequences of operations. This compression can be reversible or irreversible in particular under the effect of heat. With the two layers which are connected to one another via the connection region, in particular glued together, welded together or rolled on, namely the substrate layer on the one hand and the fine-fibre layer on the other hand, the respective advantages of the two layers, namely the high soot absorption capacity of the substrate layer can be combined with the simultaneously high degree of separation of the fine-fibre layer and because of this a filter material be created which is loaded evenly over the entire depth. The even loading of the filter material is to prevent in particular that the dirt absorption capacity of the one filter layer is exhausted before the other one. Generally it must be noted that the soot absorption capacity mentioned for the first time in this paragraph and again in the following generally stands representative of the absorption capacity for particles to be filtered out. The even loading with simultaneously extremely high filter capacity is also ensured through the pore size which narrows in flow direction. The predetermined thickness of at least 0.35 mm, preferentially 0.5-1.0 mm, also ensures the high filter performance in the long term of the filter material according to the invention. Such a filter material is used for example in pleated filter elements, which are embodied annularly closed or flat, but also in wrapped inserts with alternately closed channels, in particular for cleaning the intake air of an internal combustion engine. The substrate layer, which is additionally of low flammability, comprises the impregnation according to the invention. A cellulose material for such a substrate layer preferentially consists of up to 22% by mass of a resin, which contributes to the strength, stiffness, dimensional stability, in particular of embossed (spacers/projections) and to the protection of external influence factors (moisture, wet, chemicals such as oil, fuel). Through the one-sided impregnation according to the invention applied to the inflow side of the substrate layer clogging of very fine pores (on the outflow side) and closing or reducing of fine pores through a pendentive formation of the resin can be reduced so that the pore structure through the resin on the clean side, i.e. on the outflow side of the substrate layer is not changed at all and on the inflow side, i.e. on the raw side, only marginally so. The resin content in the substrate layer which is reduced compared with conventional resin contents (25-27% by mass) can reduce clogging of very fine pores, which are located in particular on the outflow side of a cellulose paper.

The impregnation substantially contributes to an advantageous degressive distribution of the pores in flow direction according to the invention while avoiding sudden pore size changes. In addition, both the separation performance as well as the dirt storage capacity (in particular for the loading with soot particles, which because of their fineness enter the filter material particularly deeply, can be increased.

The impregnation can be embodied as a curing impregnation which cross-links under the effect of heat or as a non-curing impregnation. Furthermore, it can comprise phenolic resins, acrylates or epoxy resins.

In an advantageous further development of the solution according to the invention, the pores of the substrate layer have a pore diameter between 65 and 85 μm, in particular a pore diameter of approximately 74 μm. Preferentially, 40 to 80% of the pores in this case are in the range of a pore diameter of approximately 65 to 85 μm, as a result of which a comparatively open-pore substrate layer with high air permeability and high soot absorption capacity can be achieved. As material for the substrate layer a polymer fleece or cellulose with or without artificial fibre component is possible for example. Through the addition of polymer artificial fibres the cellulose layer can be configured for example weldable. An addition of glass fibres in the cellulose brings about a higher capacity of the filter medium since the porosity can be selected greater.

The impregnation according to the invention cannot only improve the flame protection but also positively influence the material stability. Thus, embossed structures such as for example grooves or projections for fold spacing are given a greater dimensional stability. In principle, curing impregnations which cross-link under the effect of heat or non-curing impregnations (NC) which cross-link even without the effect of heat, can be used. Suitable impregnations are for example phenolic resins, acrylates or epoxy resins.

In contrast with the substrate layer, the pores of the fine-fibre layer can have a pore diameter between 30 and 40 μm, wherein likewise approximately 40 to 80% of the pores are in this range. Through the comparatively very small pore size, the fine-fibre layer has a low soot absorption capacity however a comparatively high degree of separation. The fibres of the fine-fibre layer can for example be formed of polyamide (PA), of polyethylene (PE), polyester or of polypropylene (PP), wherein obviously coated or entirely differently formed fibres are conceivable. A fibre diameter of the fibres in the fine-fibre layer is approximately between 1.5 and 5 μm, in particular between 1.9 and 3.4 μm, wherein an average fibre diameter is approximately 2.9 μm. The weight per unit area of the fine-fibre layer in this case is substantially below that of the substrate layer, wherein the substrate layer for example can have a weight per unit area of approximately 138 g/m², whereas the weight per unit area of the fine-fibre layer is merely approximately 20 g/m².

In the following Table 1, the soot absorption capacity in grams per m² and the degree of separation in percent are shown both of the composite filter material and the individual layers when loaded with soot from an oil lamp at a loading speed of 17.7 cm/s and 30 mbar differential pressure increase. There it is evident that in the substrate layer the soot absorption capacity with 5 g/m² is significantly above the soot absorption capacity of the fine-fibre layer, for example of the melt-blown, since with the latter the soot absorption capacity is merely around 0.6 to 0.7 g/m², i.e. approximately one tenth. The degree of separation by contrast with the fine-fibre layer is higher compared with the substrate layer, wherein the filter material seen as a total composite, consisting of the substrate layer and the fine-fibre layer which is connected to the former via the connection region, has a significantly increased soot absorption capacity and a significantly increased degree of separation compared with the individual layers.

TABLE 1 filtration characteristics of the filter material according to the invention and of its individual layer when loaded with 17.7 cm/s and soot from an oil lamp (loading up to +30 mbar differential pressure increase)

| Medium | Soot absorption capacity | Gravimetric separation [%] |
|---|---|---|
| Filter material | 6.7 | 97 |
| Substrate layer | 5.0 | 69 |
| Fine-fibre layer | 0.6-0.7 | 71 |

In the following Table 2, specific characteristics such as for example pore diameter, thickness and weight per unit area both of the individual layers as well as of the entire filter material are listed again, wherein these must be obviously seen purely exemplarily.

TABLE 2

Material characteristics

| Characteristic | Substrate layer | Fine-fibre layer | Filter material |
|---|---|---|---|
| Air permeability [l/(m²s)] | 840 | 645 | 355 |
| weight per unit area [g/m²] | 138 | 20 | 164 |
| Largest pore [μm] | 83 | 39 | 32 |
| Many pores [μm] | 74 | 34 | 26 |
| Fibre diameter [μm] | — | 1.9-3.4 | — |
| Thickness [mm] (at 0.5 kPa) | 0.65 | 0.19 | 0.77*) |

With respect to the thickness marked with *) in Table 2 it must be said that because of the material ingress in the adjacent layer the total composite (filter material) is thinner than the sum of the individual layers.

Generally, the fine-fibre layer can also comprise so-called nanofibres, which are formed in particular of any plastics, preferably of thermoplastics, such as for example polyamide (PA) or of polyurethane (PU). When using a polymer fleece for the substrate layer a textile sheet structure of individual fibres can generally be created, which are placed for example in the dry or wet state. Preferentially, a so-called random orientation fleece is employed, in which the individual fibres are freely arranged with respect to their orientation. Obviously, the substrate layer can also be formed as a so-called spunbond, which generally is to mean a spun fleece, with respect to which for example a polymer is heated in an extruder and brought up to a high pressure. The polymer is subsequently pressed in precise dosage through a die, the so-called spinnerets. On the other side, the polymer leaves the nozzle plate in the still-molten form as a fine filament and is subsequently cooled down by an airstream. On a conveyor belt following downstream which is embodied as a sieve, and with which an extraction is arranged under the sieve, the individual filaments are fixed and a so-called random orientation fleece is created, which is subsequently additionally compressed, for example rolled. Here, heated rollers (calenders) are usually employed or a steam flow, as a result of which melting together at least in regions of the individual filament fibres and thus a particularly even distribution of the weight per unit area and a homogeneous configuration of the substrate layer can be achieved.

The connection region can be formed through additional material, e.g. an adhesive, solvent or a fibre layer and/or through a special treatment of the layers, e.g. through compressing, welding or needling. When using an additional material this is joined both to the substrate layer as well as to the fine-fibre layer. Here, the additional material can for example be formed as adhesive particles or adhesive fibres with adhesive characteristics. In other configurations, the additional material is designed as an additional connection fibre layer, which under a thermal effect joins up with the substrate layer and the fine-fibre layer. Here, the fibres of the connection fibre layer can be melted on and welded together with fibres of the substrate layer and/or the fine-fibre layer. Alternatively, the melted-on fibres of the connection fibre layer can also form a mechanical bond with the substrate layer and/or the fine-fibre layer. Here, the melt of the connection fibres for example enters the pores of the substrate layer and following cooling-down forms the mechanical bond connection. When using an adhesive, the adhesive particles or adhesive fibres join the substrate layer with the fine-fibre layer. The configuration with additional connection material is advantageous since through the connection material entering the substrate layer a reduction of the pore size in the substrate material takes place and the degressive pore size in flow direction is achieved in this way.

When connecting the substrate layer to the fine-fibre layer by means of a solvent, fibres and/or regions are slightly dissolved and pressed together, as a result of which these fibres/regions of the layers are joined together. In the case of a connection without additional material the substrate layer is directly connected to the fine-fibre layer. Here, fibres or parts of the fine-fibre layer can be introduced into the substrate layer or from the substrate layer into the fine-fibre layer in order to form a composite. This can be achieved through a connection operation with/without introduction of heat. Through the material introduction in the respective other layer, the porosity in this connection region is changed. In the connection region, the porosity of the substrate layer is reduced and/or the fine-fibre layer increased. Thus, a continuous degressive pore profile over the filter medium is achieved.

Further features and advantages of the invention are obtained from the subclaims, from the drawings and from the associated figure description with the help of the drawing.

It is to be understood that the features mentioned above and still to be explained in the following cannot only be used in the respective combination stated but also in other combinations or by themselves without leaving the scope of the present invention.

A preferred exemplary embodiment of the invention is shown in the drawing and is explained in more detail in the following description.

BRIEF DESCRIPTION OF THE DRAWINGS

The only FIG. 1 shows a sectional representation through a filter material according to the invention.

DETAILED DESCRIPTION

According to FIG. 1, a filter material 1 according to the invention comprises altogether two layers 2, 4, namely a substrate layer 2 and a fine-fibre layer 4. These two layers 2, 4 are connected to one another by a connection region 3. A flow direction through the filter material 1 in this case is represented by arrows 5. At least on the inflow side of the substrate layer 2 an impregnation 6 is arranged here, which will still be discussed in more detail in the following. At least on the inflow side is to mean that a partial or complete impregnation of the substrate layer 2 is to be encompassed by the invention although the impregnation 6 in FIG. 1 is represented limited to the inflow side.

The filter material 1 according to the invention has a degressive, i.e. diminishing pore size in the flow direction 5, wherein the substrate layer 2 is arranged on the inflow side and the fine-fibre layer 4 on the outflow side. The fine-fibre layer 4 can for example be formed as a so-called melt-blown layer. A total thickness d of the filter material 1 in this case amounts to more than 0.35 mm, in particular to more than 0.6 mm. Through the pore size which is degressive in flow direction 5 the advantages of the individual layers 2, 4 can be combined with one another and a filter material 1 with simultaneously high absorption capacity and high degree of separation thus be achieved. The substrate layer 2 alone has a comparatively high absorption capacity (soot absorption capacity), of for example 5.0 g/m$^2$, whereas the fine-fibre layer 4 merely has a soot absorption capacity of 0.6 to 0.7 g/m$^2$. Together, i.e. combined into the filter material 1 according to the invention, a soot absorption capacity of 6.7 g/m$^2$ can be achieved however, as is shown for example according to Table 1. The individual degrees of separation between substrate layer 2 and fine-fibre layer 4 also differ, wherein the degree of separation of the substrate layer 2 amounts to for example 69% and the degree of separation of the fine-fibre layer 4 for example 71%. Together, i.e. combined into the filter material 1, in turn this produces a total degree of separation of 97%.

The substrate layer 2 can for example comprise a polymer fleece or cellulose with or without artificial fibre component, wherein a pore diameter is between 65 and 85 μm, in particular in the region of approximately 74 μm. The pores of the fine-fibre layer 4 by contrast have a significantly smaller pore diameter between 30 and 40 μm. In each case, 40 to 80% of the pores in this case are in the respective pore diameter ranges. The fibres of the fine-fibre layer 4 can for example consist of polyamide (PA), of polyethylene (PE), polyester or of polypropylene (PP). The diameter of the fibres of the fine-fibre layer 4 preferentially is between 1.9 and 3.4 μm, in particular around approximately 2.9 μm. Obviously, not only the entire filter material 1 can have a degressive pore size in the flow direction 5, but the individual layers 2, 3, 4 each themselves. This means that for example a larger pore size is present on the inflow side of the substrate layer 2 than on its outflow side, i.e. in the connection region 3. The pores of the connection region 3 usually have a pore diameter between 30 and 45 μm, wherein the connection region 3 can be formed in particular as an adhesive layer. Here, the adhesive can comprise adhesive particles or adhesive fibres which connect the layers 2, 4 to one another. In other configurations, the connection region can be formed without material application. To this end, the connection region can be formed by welding the substrate layer 2 together with the fine-fibre layer 4. In further configurations, the fine-fibre layer 4 can also be rolled onto the substrate layer 2.

The air permeability of the individual layers in the case of the substrate layer 2 amounts to approximately 840 1/[m$^2$s] and in the case of the fine-fibre layer 4, approximately 645 1/[m$^2$s]. Through the connection to the filter material 1 according to the invention, its air permeability only amounts to approximately 355 1/[m$^2$s].

By means of the filter material 1 according to the invention, an even loading of the same over the entire depth can be achieved, wherein in particular simultaneous filling of the individual layers and regions 2, 3, 4 can be achieved. In particular, a saturation of an individual layer or region 2, 3, 4 in particular can be avoided, which would substantially reduce the total filter performance. Through the connection region 3, the pore size profile is additionally harmonized which means that a pore size profile for example is created through adhesive fibres or adhesive particle droplets, which brings about a gradual profile of the pore size from larger to smaller. Within the connection region 3, the pore size in this case likewise proceeds degressively, i.e. on the inflow side starting with a pore size which corresponds to that of the substrate layer 2 and on the outflow side, with a pore size corresponding to that of the fine-fibre layer 4.

The substrate layer 2 additionally has a low flammability. A cellulose material for such a substrate layer 2 having a low flammability usually consists of a resin to 25-27% by mass which contributes to the strength, stiffness, dimensional stability (in particular of embossed spacers/projections) and to the protection from outer influence factors (moisture, wet, chemicals such as oil, fuel).

In particular through the one-sided impregnation 6 according to the invention which is applied at least to the inflow side of the substrate layer 2, clogging of very fine pores (on the outflow side) and closing or reduction of fine pores through a pendentive formation of the resin can be reduced so that the pore structure through the resin on the clean side, i.e. the outflow side of the substrate layer 2 is not changed at all and on the inflow side, i.e. on the wall side, only marginally so. A general reduction of the resin content in the substrate layer 2 to approximately 22% by mass can also help, which likewise reduces clogging of very fine pores, which in particular are located on the outflow side of a cellulose paper (substrate layer 2).

This substantially contributes to an advantageous degressive distribution of the pores in flow direction 5 according to the invention subject to avoiding sudden pore size changes. In addition to this, the separation performance as well as the dirt storage capacity (in particular for the loading with soot particles, which because of their fineness enter particularly deeply into the substrate layer 2 or into the filter material 1 in general) is increased. An even increase of the separation performance in flow direction 5 is also achieved, which likewise leads to an altogether increased dirt storage capacity.

The filter material 1 according to the invention can be employed in particular in air filters of internal combustion engines in automobiles, in particular also for pleated filter elements or for wrapped inserts with alternately closed channels. Through the arrangement of the individual layers 2, 3, 4 with degressive pore diameter, an altogether particularly efficient filter material 1 can be created.

The invention claimed is:

1. A filter material for an air filter, comprising:
   a substrate layer on an inflow side and a fine-fibre layer on an outflow side relative to a flow direction;
   a connection region arranged between the substrate layer and the fine-fibre layer, the substrate layer, connection region and fine-fibre layer including pores having an aggregate degressive pore size with respect to the flow direction;
   wherein a combined thickness of the substrate layer, connection region and fine-fibre layer is at least 0.35 mm;
   wherein the substrate layer includes a cellulose material and has an impregnation of resin disposed along the inflow side;
   the resin amounting to approximately 22% by mass of the substrate layer;
   wherein the connection region is composed of at least one of a composite of the substrate layer and the fine-fibre layer and an additional material, and wherein the connection region has a degressive pore size along the flow direction; and
   wherein the substrate layer has an extent along the flow direction approaching the connection region absent the impregnation of the resin.

2. The filter material according to claim 1, wherein one of the substrate layer comprises cellulose with artificial fibre component or the substrate layer comprises cellulose without artificial fibre component.

3. The filter material according to claim 1, wherein the substrate layer includes pores having a pore diameter between 65 and 85 μm.

4. The filter material according to claim 1, wherein the pores of the fine-fibre layer have a pore diameter between 30 and 40 μm.

5. The filter material according to claim 1, wherein the fine-fibre layer includes fibres of at least one of polyamide, polyethylene, polyester and polypropylene.

6. The filter material according to claim 1, wherein the fine-fibre layer includes fibres having a diameter between 1.5 and 5 μm.

7. The filter material according to claim 1, wherein at least one of the substrate layer and the fine-fibre layer individually includes pores having degressive pore size in the flow direction.

8. The filter material according to claim 1, wherein at least one of:
   the pores of the connection region have a pore diameter between 30 and 35 μm, and
   the additional material of the connection region comprises an adhesive layer.

9. The filter material according to claim 1, wherein at least one of:
   the substrate layer includes an air permeability of approximately 840 $1/m^2s$,
   the fine-fibre layer includes an air permeability of approximately 645 $1/m^2s$, and
   the substrate layer, fine-fibre layer and connection region includes an aggregate air permeability of approximately 355 $1/m^2s$.

10. The filter material according to claim 1, wherein one of:
    the impregnation of the substrate layer includes a curing impregnation cross-linking under the effect of heat, or
    the impregnation of the substrate layer includes a non-curing impregnation.

11. The filter material according to claim 1, wherein the impregnation of the substrate layer includes at least one of phenolic resins, acrylates and epoxy resins.

12. A filter element for an air filter, comprising:
    a filter material configured as at least one of (i) a wrapped insert with alternately closed channels, and
    (ii) at least one of pleated, annularly closed and flat, the filter material including:
       a substrate layer having pores disposed on an inflow side of the filter material and a fine-fibre layer having pores disposed on an outflow side of the filter material relative to a flow direction, the substrate layer including a cellulose material and having an impregnation of a resin arranged along the inflow side, the resin having a content of approximately 22% by mass of the substrate layer, wherein the impregnation of the resin is limited to the inflow side of the substrate layer and the substrate layer is absent the impregnation of the resin on a side approaching the fine-fibre layer;

a connection region having pores arranged between the substrate layer and the fine-fibre layer;

wherein the filter material has a degressive pore size in the flow direction and includes a thickness of at least 0.35 mm, and wherein the substrate layer has a greater percentage thickness than the fine-fibre layer.

13. The filter material according to claim 9, wherein the substrate layer includes pores having a pore diameter between 65 and 85 µm and the fine-fibre layer includes pores having a diameter between 30 and 40 µm.

14. The filter material according to claim 13, wherein forty to eighty percent of the pores in the substrate layer and fine-fibre layer have diameters within the respective ranges.

15. The filter material according to claim 5, wherein the fine-fibre layer includes fibres having a diameter between 1.5 and 5 µm.

16. A filter material for an air filter of an internal combustion engine, comprising:

a substrate layer composed of at least one of a cellulose material and a polymer fleece material, the substrate layer including pores having a pore diameter between 65 and 85 µm;

a fine-fibre layer including pores having a pore diameter between 30 and 40 µm and fibres having a diameter between 1.5 and 5 µm;

a connection region arranged between the substrate layer and the fine-fibre layer, wherein the substrate layer is disposed on an inflow side and the fine-fibre layer is disposed on an outflow side relative to a flow direction;

wherein a thickness of the substrate layer is at least 75% of a total composite thickness of the substrate layer, connection region and fine-fibre layer;

wherein the substrate layer includes an impregnation portion of a resin arranged along the inflow side, the resin constituting a content of approximately 22-25% by mass of the substrate layer, and wherein the substrate layer has an extent along the flow direction approaching the connection region absent the impregnation portion of the resin;

wherein the pore size of the combined substrate layer, connection region and fine-fibre layer collectively decreases in the flow direction.

17. The filter material according to claim 16, wherein the resin of the impregnation portion includes at least one of phenolic resins, acrylates and epoxy resins.

18. The filter material according to claim 16, wherein the connection region is composed of at least one of a composite of the substrate layer and the fine-fibre layer and an additional material, and wherein the connection region has a degressive pore size along the flow direction.

19. The filter element according to claim 12, wherein the connection region is composed of at least one of a composite of the substrate layer and the fine-fibre layer and an additional material, and wherein the connection region has a degressive pore size along the flow direction.

* * * * *